Oct. 3, 1950   J. B. LEGROW   2,524,391
BAGGING AND WEIGHING DEVICE
Filed Oct. 16, 1948   2 Sheets-Sheet 1

INVENTOR.
JACK B. LE GROW,
BY Robert N Fulwider
ATTORNEY.

Oct. 3, 1950  J. B. LEGROW  2,524,391
BAGGING AND WEIGHING DEVICE
Filed Oct. 16, 1948  2 Sheets-Sheet 2
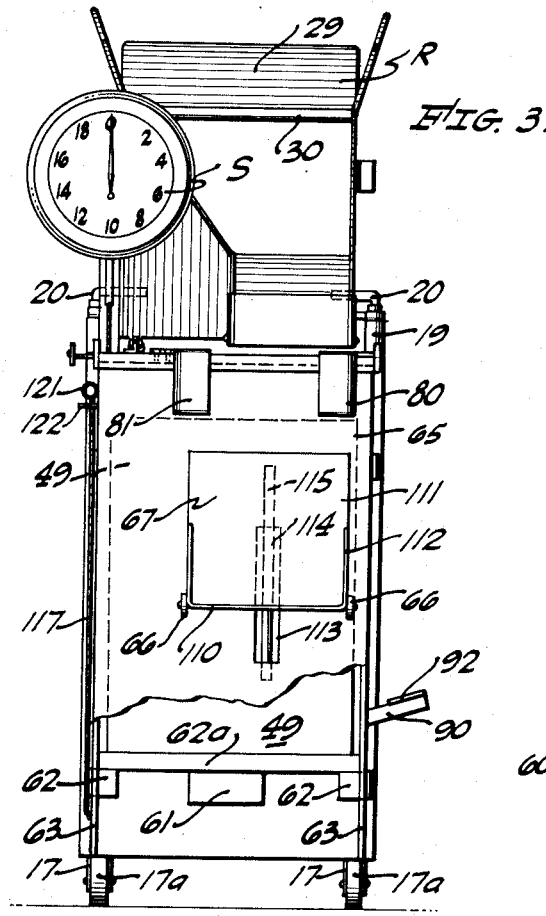
INVENTOR.
JACK B. LE GROW,
BY
Robert W Fulwider
ATTORNEY.

Patented Oct. 3, 1950

2,524,391

UNITED STATES PATENT OFFICE 2,524,391

BAGGING AND WEIGHING DEVICE

Jack B. Legrow, South Gate, Calif.

Application October 16, 1948, Serial No. 54,883

14 Claims. (Cl. 226—58)

My invention relates to the field of packaging equipment, and more particularly to a device adapted to removably hold a bag in a receiving position and concurrently weigh the quantity of material such as fruits, vegetables or other materials placed within the confines thereof.

Although a number of weighing and bagging devices have been devised and marketed in the past, the majority of these devices have a complicated structure, are bulky and cumbersome in appearance, and totally unsuited for packaging vegetables and fruits as is common practice in the present day markets. It is to eliminate the disadvantages of the previously available weighing and bagging machines that I have devised my present invention.

A major object of my invention is to provide a weighing and bagging machine that is adapted for placing a predetermined weight of fruit, vegetables or other materials in individual bags of such size as the material is normally marketed in, that can easily be moved from place to place, and will be so simple in operation that it may be used for the purpose for which it is intended by an inexperienced person with but a minimum of instruction.

Another object of my invention is to provide a device which will permit the rapid bagging and weighing of various commodities, will have an extremely simple mechanical structure, require little or no maintenance, can be fabricated from standard commercially available material in a relatively simple manner, and due to the relatively low cost of manufacture the device can be retailed to commercial establishments requiring such a piece of equipment at a sufficiently low purchase price as to encourage its widespread use.

These and other objects and advantages of my bagging and weighing device will become apparent from the following description of a preferred form thereof, and from the drawings illustrating that form in which:

Fig. 3 is a front elevational view of the device;

Fig. 4 is a side elevational view of the forward portion of the device;

Fig. 5 is a fragmentary plan view of the bag holding members and the track on which one member is movably mounted;

Fig. 6 is a diagrammatic view of the bag support and the manner in which it is vertically adjusted; and Fig. 7 is a diagrammatic view of the bag holding member vertically positioned, and the foot operated lever used in placing the members in a bag engaging position.

Figure 1:
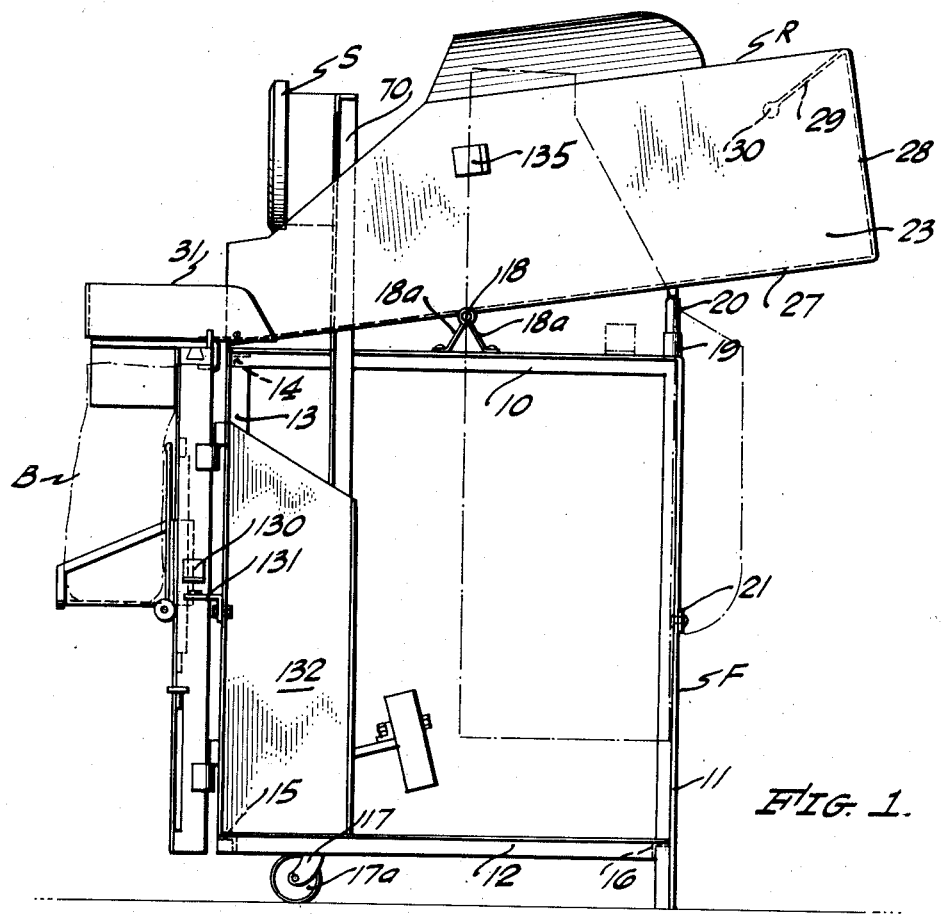
Fig. 1 is a side elevational view of my bagging and weighing device.
Figure 2:
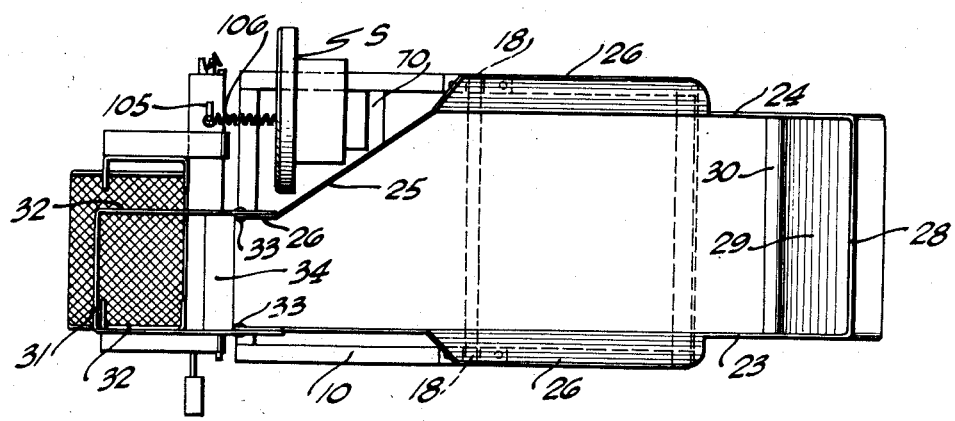
Fig. 2 is a plan view of the device.

Referring now to Figs. 1 and 2 for the general arrangement of my invention it will be seen that a substantially rectangular framework F supports a vertically adjustable receptacle R which is adapted to receive the commodity desired to be dispensed. A pair of bag engaging members M hold a bag B, indicated by phantom line, during the time the bagging operation is taking place, with the weight of the material situated in the bag B being readable at all times on the face of the scale S.

The frame F is preferably formed from a rigid material such as angle iron, and includes two parallel, laterally spaced, side pieces 10, each of which terminates on its rearward end in a downwardly extending leg 11. A substantially horizontal supporting member 12 is affixed to and extends forwardly from the leg 11 a short distance above the lower end thereof. Extending upwardly from the forward portion of each of the members 12 is a substantially vertical leg 13, which on its upper end is affixed to the forward end of one of the cross pieces 10. An upper and lower horizontal cross member 14 and 15 respectively, connects the two sides of the frame F, and holds them in the desired relationship with one another. A similar cross member 16 likewise extends between the sides of the frame F at the intersection of the leg 11 and the supporting member 12.

To provide for my bagging and weighing device being moved from one place to another on the supporting floor, an arm 17 is provided on the lower forward portion of each of the supporting members 12, with each of the arms rotatably supporting a roller 17a. A transversely positioned horizontal shaft 18 is centrally disposed above the cross pieces 10, and is supported from each cross piece by an inverted V-shaped member 18a which is affixed by suitable bolts to the cross piece. Situated on the rearward upper portion of the cross piece 10 and in alignment with the leg 11 is a tubular member 19 that rotatably supports an L-shaped member 20. The member 20 by conventional means is prevented from being displaced from the tubular member 19. Each of the members 20 serves a dual purpose, in that, it provides a handle in moving my device from place to place by use of the rollers 18, and acts when its upper leg is turned inwardly as best seen in Fig. 1 as a support for the receptacle R when the receptacle is in a dispensing position. Upon each of the L-shaped members 20 being rotated so that the upper horizontal leg thereof is pointed outwardly from the frame F, the receptacle R is no longer supported and can be rotated vertically downward to occupy the position shown by phantom line in Fig. 1. Should it not be desired to have the receptacle vertically positioned, a bar 21 which is pivotally supported on one end from the rearward face of one of the legs 11 is raised into a horizontal receptacle supporting position, with the opposite end of the bar by conventional means being locked to the adjoining leg 11.

The receptacle R as best seen in Figs. 1 and 2 is substantially rectangular in shape, and is formed with two side walls 23 and 24, with the side wall 24 having a forwardly disposed portion 25 that extends inwardly to terminate in a relatively short wall portion 26 that is parallel to the wall 23. The central portion of both the side walls 23 and 24 extends upwardly above the balance of the wall and flares outwardly into a portion 26 which is of assistance in filling the receptacle when it is in the horizontal position. The side walls 23 and 24 are connected on their lower edges by a bottom piece 27, and on their rearward ends by a vertical end piece 28. The upper edge of the end piece 28 terminates in a forwardly and downwardly extending portion 29, which on its forward edge terminates in a curved portion 30 that prevents injury to fruit and vegetables contained in the receptacle when the receptacle is suddenly lowered into the vertical position shown by phantom line in Fig. 1. The wall portion 29 serves to prevent the commodities situated in the receptacle R from rolling therefrom when the receptacle is lowered into the substantially vertical filling position.

A rectangular U-shaped guide 31 having parallel legs 32 is pivotally supported from the forward portion of the receptacle R by bolts 33 which engage the legs 32 and the forward portion of the side walls forming the receptacle. The rearward portion of the member 31 is provided with a horizontal plate 34 that forms as extension of the bottom piece 27 in order that the commodities situated in the receptacle R can roll forwardly to drop downwardly through the opening formed in the forward portion of the guide 31. Upon the guide 31 being rotated upwardly into a substantially vertical position, the member 34 closes the open end of the receptacle R to prevent fruit or vegetables contained therein from rolling along the sloping bottom piece 27 to be dispensed from the receptacle.

Located on each side of the frame F, and rearwardly from each of the legs 13, is a vertically positioned upright 36 which is secured to one of the cross pieces 10 and the supporting members 12. Two vertically spaced cross members 37 and 38, preferably formed of angle iron, extend between and are secured to the members 36. A rectangular plate 39, having two laterally spaced ears 39a extending forwardly from the upper portion thereof and two similar ears 39b situated in a like position near the bottom, is rigidly affixed to the forward faces of the cross members 37. Each of the ears 39a and 39b is provided on the interior face with a horizontal bore therein whereby a shaft 42 can be supported between the ears 39a and a shaft 43 between the ears 39b. A sleeve 44 is rotatably mounted on the shaft 42 and is provided with a forwardly extending rigid member 45.

The forward portion of the member 45 is rigidly connected to a sleeve 46 that is rotatably mounted on a shaft 47. The shaft 47 is supported between two laterally spaced ears 48 that are formed on the upper rearward face of a rectangular plate 49 that is similar in construction to the plate 39. Both the plates 39 and 49 are for lightness preferably formed from a metallic material such as aluminum or magnesium. The lower rearward portion of the plate 49 is formed with two laterally spaced ears 50 extending rearwardly therefrom, with each of the ears having a bore formed therein which serve to support a horizontally positioned shaft 51. A sleeve 52 is rotatably mounted on the shaft 51 and is prevented from being laterally displaced by the ears 50. A rigid lever 56 is connected to the upper surface of the sleeve 52, and extends rearwardly therefrom to pass through an opening 57 formed in the plate 39. The lever 56 is rigidly connected on its under side to the upper surface of the shaft rotatably supported between bearings 43. An L-shaped member 59 is welded or otherwise secured to the rearward portion of the lever 56, and supports a bolt 60 on which a counterweight 61 is mounted for reasons which will hereinafter be explained.

A number of L-shaped brackets 62 extend forwardly from two vertically spaced horizontal members 62a which are affixed to the forward face of the plate 49, with each of the brackets being welded to one of the side walls 63 of a rectangular frame 64. The frame 64 supports a vertical rectangular sheet of metal which forms an apron 65 on which the wheels 66 of a bag support 67 travel as will hereinafter be explained. Thus it will be seen from the previous description that the frame 64 is vertically movable, and having its weight and that of the plate 49 compensated for by the counterweight 61.

In Figs. 1, 2 and 4 it will be seen that an upright member 70 is mounted at a convenient position on the forward portion of one of the cross pieces 10, and serves to support the scale S which is of the conventional dial form as best seen in Fig. 3. The weighing member 71 of the scale S extends downwardly and supports an S-shaped hook 72 that engages a chain 73. The chain 73 on its lower end is affixed to the rearward end of a bracket 74 that is supported from the frame 64. To prevent excessive vibration of the indicating portion of the scale when the scale is being used in the weighing of commodities dispensed from the receptacle R, a dash pot 75 of conventional design is employed.

The cylindrical body portion of the dash pot 75 is mounted on a forwardly extending L-shaped bracket 76 which is bolted or otherwise secured to the forward face of the plate 39. An inverted L-shaped bracket 77 is affixed to the rearward face of the plate 49 and engages the upper end of a piston rod 78 that is slidable in the dash pot 75. An adjustment nut 79 situated on the rod 78 regulates the damping effect of the dash pot 75 on the scale indicator by controlling the freedom with which a piston can move in the dash pot 75.

The bag B at the time the material is being dispensed therein from the receptacle R is held in position by two engaging arms 80 and 81 which contact the upper inner surface of the bag. Each of the arms 80 and 81 is formed from a U-shaped band of material, with the outer legs of the U-shaped bands extending inwardly toward one another. The arm 80 as may best be seen in Figs. 3 and 5 is stationary, and is supported from a member 82 which is rigidly affixed to a horizontally positioned bar 83 that is rotatably supported on pins 84 from the upper portion of the frame 64. The bar 83 is provided on its upper surface with a longitudinally extending groove 85 in which a member 86 that supports the bag engaging arm 81 is slidably mounted.

The movably mounted bag engaging arm 81 is actuated by a lever 90 that is pivotally supported on a horizontally positioned pin 91 from the interior face of the apron 65. In Figs. 3 and 7 it will be noted that the lever 90 projects from the frame F of my device, and is provided on the outer end with a pedal 92 that is adapted to be contacted by the foot of the operator of the device when he desires to place the arms 80 and 81 in a bag engaging position. Fig. 7 illustrates the manner in which a flexible cord 93 extends upwardly from the outer end of the lever 90, and passes over a pulley 94 that is rotatably supported by a pin 95 from the rearward face of the apron 65. The cord 93 after passing over the pulley 95 is rigidly connected to the rearward portion 96 of the member 86. A flexible cord 97 is connected to the opposite end of the member 96, with the cord engaging a pulley 98 which is rotatably supported from a pin 95 on the rearward face of the apron 65. The cord 97 after passing over the pulley 98 extends downwardly, and terminates in a helical spring 99 having its lower end affixed by a screw 100 to the rearward face of the apron 65.

Thus, it will be seen that upon the operator placing his foot on the pedal 92 and pressing downwardly, the lever 90 is rotated downwardly to cause the cord 93 to move the arm 81 into a bag engaging position. Upon pressure being released from the pedal 92 the spring 99 which is now in tension contracts, with the result that the arm 81 is moved into a bag engaging position, and at the same time the lever 90 is returned to its initial position. After a bag B has the members 80 and 81 inserted in the top portion thereof it will be apparent that due to the tension of the spring 99 the arm 81 could easily tear an empty bag if the foot of an operator was suddenly removed from the pedal 92.

To remove the hazard of bags being torn due to the member 81 suddenly engaging same, a bridge 101 is formed near the end of the groove 85 on the end of the member 83 opposite the bag engaging member 80. The bridge 101 is formed with a longitudinally extending tapped bore therein which is engaged by the threaded portion of a rod 102 which has a handle 103 affixed to the outer end thereof. The inner end of the rod 102 is provided with a rubber stop 104 which is affixed to the rod 102 by conventional means whereby it will be slidable in the groove 85 but will not rotate with the rod 102. Thus, by rotating the handle 103 the stop 104 is advanced to a position in the groove 85 whereby should the lever 90 be suddenly released after the members 80 and 81 are situated within the confines of the bag B the member 81 will move to the left in Fig. 5 as previously described, but will be prevented from tearing the bag due to engaging the stop 104. Thus, the stop 104 is positioned for the width of the particular sized bag which is being used on my device.

In Figs. 5, 6 and 7 it will be seen that the member 83 is pivotally supported on the pins 84 from the upper horizontal member of the frame 64, with the result that the member can either be positioned in the vertical bag engaging position shown in Fig. 4, or the bag engaging position shown in Fig. 7. To maintain the arms 80 and 81 in the vertical position shown in Fig. 7, the member 83 is provided with an upwardly extending arm 105 which has a helical spring 106 affixed thereto with the lower end of the spring connected to the bracket 74. The tension on the spring 106 is not sufficient to rotate the members 80 and 81 from the position shown in Fig. 4, but when this is done manually by rotating the member 83 upwardly the spring 106 has sufficient tension to hold the member 83 in this position until it is returned to the normal bag engaging position shown in Fig. 4.

Commodities being rapidly dispensed from the receptacle R are prevented from tearing the bag B by the bottom of the bag resting on a horizontal shelf 110 that is formed as a part of the bag support 67. In Figs. 3, 4 and 6 is will be noted that the bag support 67 is formed with a vertically positioned member 111 from which the shelf 110 extends forwardly, with the shelf having upwardly extending side walls 112 to prevent the bag B from being inadvertently displaced from the shelf 110.

The bag support 67 moves upwardly and downwardly by the wheels 66 traveling over the forward face of the apron 65, with this movement taking place due to the member 111 having an arm affixed to the rearward face thereof which extends through a vertical slot 113 formed in the apron 65. The arm is rigidly affixed to a sleeve 114 that is slidably mounted on a vertically positioned rod 115, which rod is rigidly affixed to the rearward face of the apron 65. The sleeve 114 has an arm 116 projecting therefrom which is connected to a flexible cord 117 that extends upwardly to engage a pulley 118 which is rotatably mounted on the rearward face of the apron 65. The cord 117 after passing over the pulley 118 extends downwardly to engage a second pulley 119 which is rotatably supported from the rearward face of the apron 65, with the cord then continuing to the exterior edge of the apron 65 where it engages a suitable member and proceeds upwardly to terminate in a ring 121. An L-shaped member 122 is affixed to the upper side portion of the face 64, with the member 122 having a V-shaped notch 123 formed in the outwardly extending arm thereof which is utilized in engaging one of the links or knots formed in the outer portion of the cord 117 to hold the bag support 67 in the desired vertical position. A helical spring 124 is situated intermediately between the pulleys 118 and 119, with the ends of the springs being affixed by conventional means to the cord 117.

The operation of my invention is extremely simple. The receptacle R is positioned for filling either by placing it in the substantially vertical position shown by phantom line in Fig. 1, or having the bottom of the receptacle rest on the pivotally mounted bar 21. With the receptacle R filled with vegetables or fruit, or the material desired to be dispensed, it is moved upwardly into the position shown in Fig. 1 by solid line, with the L-shaped members 20 being rotated so that the horizontal portions thereof are situated in a supporting position under the bottom piece 27 of the receptacle. It will be noted that the receptacle R when in a dispensing position has the bottom piece 27 situated on a forwardly and downwardly sloping angle so that the material situated within the confines of the receptacle R tends to roll forwardly. To prevent the material being dispensed from the receptacle R, the forward portion thereof blocked by the member 34 which occurs as the guide 31 is rotated clockwise into a vertical position.

A bag B is placed in a receiving position by stepping on the pedal 92 to place the arms 80 and 81 in a contracted position. This operation can occur with the arms vertically positioned as shown in Fig. 4, or when the bar 83 is rotated on the pins 84 into the position shown in Fig. 7 wherein the arms 80 and 81 are horizontally positioned. The manner in which the bag B is placed in a receiving position on the arms 80 and 81 is simply one of convenience for the operator.

Prior to the bag B having material dispensed therein from the receptacle R it is essential that the bag be vertically positioned as shown in Fig. 1. The bag support 67 is vertically adjusted by the use of the cord 117, until the shelf 110 is contacting the lower portion of the bag B. Thus, any sudden movement of material from the receptacle R to the bag will not tear the bottom from the bag, due to the supporting action of the shelf.

The scale S as previously described is connected to the apron 65, which apron, its supporting frame 64, and the plate 49 have their weight compensated for by the weight 61. It will be apparent that as material is transferred from the receptacle R to the bag B that the weight of material in the bag is at all times readable on the scale S. After a bag B has the desired amount of material contained therein, the pedal 92 is pushed downwardly to cause the arms 80 and 81 to become disengaged from the interior of the bag B whereby it can be removed from my device. As pressure is applied to the pedal 92 the frame 64 tends to move downwardly, but this movement is restricted by a bracket 130 affixed to the frame which engages a frame supported stop 131 as can best be seen in Fig. 1. Should it be desired the forward portion of my device can be enclosed by a shield 132 of sheet metal as can also be seen in Fig. 1. To maintain the receptacle R in a vertical position whereby it will not pivot forwardly as material is placed therein, each of the sides 23 of the receptacle is provided with an L-shaped stop 135 which rests on the upper surface of one of the side pieces 10 as best seen in phantom line in Fig. 1.

Although the above described device is fully capable of attaining the objects and providing the advantages hereinbefore stated, it is to be understood that it is merely illustrative of the presently preferred form of my invention, and that I do not mean to limit myself to the details herein shown and described other than as defined in the appended claims.

I claim:

1. A bagging and weighing device which includes: a frame; a receptacle pivotally supported from said frame, with said receptacle when pivoted in a substantially vertical position being adapted to be filled with a dispensable material, and said receptacle when pivoted in a forwardly and downwardly sloping position being adapted to dispense said material from the forward portion of said receptacle; a vertically movable apron pivotally supported from said frame; means connected to said apron for holding a bag in a position whereby a portion of said material can be dispensed from said receptacle to said bag; and means for continuously weighing said material dispensed into said bag.

2. A bagging and weighing device which includes: a movably mounted frame; a receptacle pivotally supported from said frame; two laterally spaced horizontally rotatable L-shaped members, with said members when rotated to a position where the horizontally positioned legs extend outwardly permitting said receptacle to assume a substantially vertical position whereby it can be filled with a dispensable material, and said members when said legs extend inwardly towards one another supporting said receptacle in a forwardly and downwardly extending position whereby said material can be dispensed therefrom; means for holding a bag in a position whereby a portion of said material can be dispensed from said receptacle to said bag; and means for continuously weighing said material dispensed into said bag.

3. A bagging and weighing device which includes: a frame; a receptacle mounted on said frame, with said receptable being positioned whereby material can be dispensed therefrom; a vertically movable apron pivotally supported from said frame; a pair of bag engaging arms supported from said apron with said arms being adapted to hold a bag in a position whereby material can be dispensed from said receptacle to said bag; and means for continuously weighing said material as it is dispensed into said bag.

4. A bagging and weighing device which includes: a frame; a receptacle mounted on said frame, with said receptacle being positioned whereby material can be dispensed therefrom; a vertically movable apron pivotally supported from said frame; counterweighted lever means for balancing the weight of said apron; a stationary bag engaging arm supported from said apron; a spring loaded bag engaging arm supported from said apron, with said arms being adapted to engage the interior surface of a bag whereby said bag is held in a position in which material can be dispensed from said receptacle to said bag; and weighing means for continuously registering the weight of said material dispensed into said bag.

5. A bagging and weighing device which includes: a frame; a material dispensing receptacle mounted on said frame; a vertically movable apron pivotally supported from said frame; counter weighted lever means for balancing the weight of said apron; bag holding means supported on said apron, with said means being adapted to hold a bag in position whereby material can be dispensed from said receptacle to said bag; bag supporting means supported from said apron to prevent the sudden movement of material from said receptacle to said bag from tearing said bag; and scale means cooperating with said apron to continuously register the amount of said material dispensed from said receptacle into a bag held by said bag holding means.

6. A bagging and weighing device which includes: a frame; a material dispensing receptacle mounted on said frame; a vertically positioned apron pivotally supported from said frame; counterweighted lever means for balancing the weight of said apron; a stationary bag engaging arm supported above said apron; a spring loaded movably mounted bag engaging member supported above said apron, with said members cooperating to hold a bag therebetween in a position to receive material dispensed from said receptacle; scale means cooperating with said apron to continuously register the weight of material dispensed into a bag held between said arms; and lever means for causing the movement of said movably mounted bag engaging member whereby said bag can be removed from said device after a predetermined weight of material has been dispensed therein.

7. A bagging and weighing device which includes: a frame; a material dispensing receptacle mounted on said frame; a vertically positioned apron movably supported from said frame; counterweighted lever means for balancing the weight of said apron; spring loaded bag engaging means operatively associated with said apron, with said means being adapted to hold a bag in position on said apron whereby material can be dispensed into said bag from said receptacle; a vertically adjustable bag support mounted on said apron, with said support engaging the lower portion of said bag whereby as material is suddenly dispensed from said receptacle into said bag it will not tear the bottom portion thereof; and scale means cooperating with said apron to continuously register the weight of material dispensed from said receptacle to said bag.

8. A bagging and weighing device which includes: a substantially rectangular frame; a material dispensing receptacle mounted on said frame; a lever pivotally supported from said frame; an apron, with said apron being supported in a vertically movable position by said lever; a counterweight mounted on said lever, with said weight balancing the weight of said apron; bag engaging means operatively associated with said apron, whereby a bag can be supported in a position to have material dispensed therein from said receptacle; a bag supporting member mounted in a vertically adjustable position on said apron, with said member engaging the lower portion of said bag to prevent material dispensed from said receptacle tearing the lower portion of said bag; and a scale connected to said apron with said scale at all times registering the weight of material dispensed from said receptacle into said bag.

9. A bagging and weighing device which includes: a frame: a material dispensing receptacle mounted on said frame; a counterweighted apron supported in a vertically movable position from said frame; a stationary bag engaging arm supported from said apron; a movable bag engaging arm supported from said apron; a foot operated lever pivotally supported on said apron, with said lever being operatively associated with said movable bag engaging arm whereby as said lever is actuated in one direction said lever is moved inwardly into a bag engaging position; spring means for moving said movable arm in the opposite direction whereby a bag will be supported between said arms in a position to receive material dispensed from said receptacle upon pressure being released from said lever; and scale means operatively associated with said apron, with said scale at all times registering the weight of material dispensed from said receptacle into said bag.

10. A bagging and weighing device which includes: a frame; a material dispensing receptacle mounted on said frame; a counterweighted apron supported in a vertically movable position from said frame; bag engaging means supported from said apron, with said means being adapted to support a bag in a position whereby material can be dispensed from said receptacle to said bag; a bag support, with said support having a member that protrudes through a vertically extending slot formed in said apron; wheel means affixed to said support, and permitting said support to move vertically over the exterior surface of said apron; cord means engaging said apron supported members, and permitting said support to be vertically positioned to engage the lower portion of said bag to prevent it being torn as material is dispensed from receptacle into said bag; and scale means connected to said apron, with said scale at all times registering the weight of material dispensed from said receptacle into said bag.

11. A bag engaging device which includes: a bar having a longitudinally extending groove formed therein; a stationary bag engaging arm affixed to said bar; a movable bag engaging arm slidably mounted in said groove; spring means connected to and urging said movable arm outwardly in said groove; lever means operable to move said movable arm inwardly against the urging of said spring; and an adjustment screw positioned in one end of said groove, with the end of said screw engaging one side of said movable arm as it is moved outwardly to prevent said arm being moved but a predetermined amount which prevents the sides of a bag being engaged by said arms from being torn by sudden movement of said movable arm.

12. A bag engaging device which includes: a bar pivotally mounted on a horizontal axis and movable from a vertical position to a horizontal position, said bar having a longitudinally extending groove formed therein; a stationary bag engaging arm affixed to said bar and extending outwardly therefrom; a movable bag engaging arm slidably mounted in said groove and extending therefrom parallel to said first arm; an adjustment screw longitudinally movable within said groove; a resilient buffer on the inner end of said screw, confined within said groove; an apron extending downwardly from said bar; a lever pivotally mounted on said apron; cord means operatively connecting said lever and said movable arm whereby as said lever is moved downwardly said arm is moved inwardly to a bag engaging position; and spring means moving said movable arm outwardly to a position where a bag is supported between said movable and stationary arms, with said buffer engaging said movable arm and preventing it from moving outwardly but a predetermined distance as said lever is released.

13. A bagging and weighing device which includes: a substantially rectangular frame; roller means for moving said frame; a material dispensing receptacle, with said receptacle being pivotally supported on said frame whereby it can be vertically tilted for filling, and substantially horizontally disposed for dispensing material contained therein; a pair of laterally spaced members, with said members being pivotally supported from said frame; an apron rigidly affixed to one of said members; a lever connected to said apron supporting member; a counterweight supported from said lever, with said weight balancing the weight of said apron and supporting member; a pair of bag engaging arms mounted on said apron; lever means for moving one of said arms whereby a bag can be engaged and supported in a position to receive material dispensed from said receptacle; spring means for holding said arms in a bag engaging position after pressure is removed from said lever means; means for controlling the flow of material from said receptacle to said bag held in position by said arms; a vertically adjustable bag support mounted on said apron, with said support being adapted to engage the lower portion of said bag to prevent it being torn as material is dispensed from said receptacle into said bag; a scale, with said scale being connected to said apron, and said scale registering at all times the weight of material dispensed from said receptacle into said bag; and a dash pot situated between and operatively associated with said laterally spaced members whereby the major portion of the vibrations of the indicating device on said scale are removed during the bagging and weighing of material with said device.

14. A bagging and weighing device which includes: a substantially rectangular frame; a material dispensing receptacle supported on said frame and pivotally movable from a material receiving to a material dispensing position; a lever pivotally supported on said frame and movable about a horizontal axis; an apron on the forward portion of said frame supported for vertical movement by said lever; a counterweight mounted on the end of said lever, with said weight balancing the weight of said apron; bag engaging arms operatively associated with said apron to engage and hold the upper portion of a bag in a position to receive material dispensed from said receptacle; a vertically adjustable platform to support the lower portion of said bag and prevent material dispensed from said receptacle from tearing said bag; and a scale connected to said apron with said scale at all times registering the weight of material dispensed from said receptacle into said bag.

JACK B. LEGROW.

REFERENCES CITED

The following references are of record in the file of this patent:

UNITED STATES PATENTS

| Number | Name | Date |
|---|---|---|
| 720,543 | Wiley | Feb. 10, 1903 |
| 1,175,982 | Parent | Mar. 21, 1916 |
| 1,438,254 | Moss | Dec. 12, 1922 |
| 1,445,078 | Freeman | Feb. 13, 1923 |
| 1,849,256 | Trovaton | Mar. 15, 1932 |